(12) United States Patent
Kobayashi et al.

(10) Patent No.: US 7,717,764 B2
(45) Date of Patent: May 18, 2010

(54) METHOD OF MANUFACTURING IMAGE DISPLAY PANEL AND IMAGE DISPLAY PANEL

(75) Inventors: Taichi Kobayashi, Kodaira (JP); Hidetoshi Hiraoka, Nishitokyo (JP); Takanori Shoji, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 1069 days.

(21) Appl. No.: 10/571,465

(22) PCT Filed: Sep. 10, 2004

(86) PCT No.: PCT/JP2004/013240
§ 371 (c)(1),
(2), (4) Date: Mar. 13, 2006

(87) PCT Pub. No.: WO2005/026832
PCT Pub. Date: Mar. 24, 2005

(65) Prior Publication Data
US 2007/0029931 A1    Feb. 8, 2007

(30) Foreign Application Priority Data

| Sep. 12, 2003 | (JP) | ............................. 2003-321632 |
| Sep. 30, 2003 | (JP) | ............................. 2003-340930 |
| Sep. 30, 2003 | (JP) | ............................. 2003-340944 |

(51) Int. Cl.
*H01J 9/00* (2006.01)

(52) U.S. Cl. ........................................................ 445/23

(58) Field of Classification Search ............... 445/23–25
See application file for complete search history.

(56) References Cited

U.S. PATENT DOCUMENTS

| 2002/0027635 A1 | 3/2002 | Sakamaki et al. |
| 2002/0188053 A1 | 12/2002 | Zang et al. |
| 2003/0210455 A1 | 11/2003 | Tseng et al. |

FOREIGN PATENT DOCUMENTS

| JP | 1266510 A2 | 10/1989 |
| JP | 2001-92388 A | 4/2001 |
| JP | 2002-72257 A | 3/2002 |
| JP | 2002296622 A2 | 10/2002 |
| WO | WO 01/67170 A | 9/2001 |

*Primary Examiner*—Joseph L Williams
(74) *Attorney, Agent, or Firm*—Sughrue Mion, PLLC

(57) ABSTRACT

A method of manufacturing an image display panel, having one or more cells formed in an isolated manner from one another by partition walls and accommodating image display media and a plurality of image display elements, in which the image display media are sealed between opposed two substrates, at least one of the two substrates being transparent, and, in which the image display media, to which an electrostatic field is applied, are made to move so as to display an image, characterized in that the improvement comprises the steps of: (1) manufacturing a substrate with the partition walls on one substrate; applying an adhesive mixture obtained by mixing a photo-curing resin and a heat-hardening resin on the partition walls; and then connecting the other substrate to the partition walls through the adhesive mixture, the steps of: (2) manufacturing a substrate with the partition walls by forming the partition walls on one substrate; performing a washing by a dry treatment with respect to the thus manufactured substrate with the partition walls; applying an adhesive on the partition walls; and connecting the other substrate to the partition walls through the adhesive, or the steps of: (3) manufacturing the partition walls on one substrate by means of a pale color resist; applying an adhesive colored by a dark color on the partition walls; and connecting the other substrate to the partition walls through the adhesive.

20 Claims, 7 Drawing Sheets

METHOD OF MANUFACTURING IMAGE DISPLAY PANEL AND IMAGE DISPLAY PANEL

TECHNICAL FIELD

The present invention relates to a method of manufacturing an image display panel and an image display panel, in which an image can be displayed or deleted repeatedly by moving an image display media (particles or liquid powders) by means of electrostatics.

BACKGROUND ART

As an image display device substitutable for liquid crystal display (LCD), image display devices with the use of technology such as an electrophoresis method, an electro-chromic method, a thermal method, dichroic-particles-rotary method are proposed.

As for these image display devices, it is conceivable as inexpensive visual display device of the next generation from a merit having wide field of vision close to normal printed matter, having smaller consumption with LCD, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an image display device comprising an image display panel is known, which has one or more cells formed in an isolated manner from one another by partition walls and accommodating image display media and a plurality of image display elements, in which the image display media are sealed between opposed two substrates, at least one of the two substrates being transparent, and, in which the image display media, to which an electrostatic field is applied, are made to move so as to display an image.

As one example, in the image display device, the partition walls are formed by: laminating a dry-film resist on one of the substrates (or substrates with electrodes) e.g. on an ITO glass substrate as the transparent substrate; performing a pattern exposure through a mask by means of i-line parallel light; developing it by using a sodium carbonate solution; washing it by using a purified water; and drying it. Here, the i-line means ultraviolet rays having a wavelength of 360 nm used as a light source of an exposure device, as is known in the prior art. After that, the image display panel is formed by: applying an adhesive on the partition walls; and connecting the other substrate e.g. opposed substrate to the partition walls through the adhesive. In the method of manufacturing image display device mentioned above, a technique is generally known such that the substrates and the partition walls are connected by using a hot-melt adhesive and a reaction type hot-melt adhesive as the adhesive (for example, Japanese Patent Laid-Open Publication No. 2002-296622).

However, there is a drawback such that an adhesion property to the glass used as the substrate is not sufficiently obtained if using the hot-melt adhesive or the reaction type hot-melt adhesive. As a result, in various endurance tests (heat-resistant test, humidity test), there is a drawback such that the adhesion property is decreased remarkably. Moreover, if using such liquid-like adhesives, there is a drawback such that the image display media remaining on the partition walls can not be removed due to the adhesive on the partition walls in the case of filling the image display media between the partition walls (tasks of a first aspect of the invention).

Moreover, in the method of manufacturing the image display device mentioned above, a connection between the partition walls formed on one substrate and the other substrate is performed by using the adhesive. In this case, since a washing with respect to the substrate and the partition walls before applying the adhesive is not sufficient, there is a drawback such that a sufficient adhesion property can not be obtained. As a result, in various endurance tests (heat-resistant test, humidity test), there is a drawback such that the adhesion property is decreased remarkably (tasks of a second aspect of the invention).

As one method for overcoming the various problems mentioned above, an image display device comprising an image display panel is known, in which image display media are sealed in cells formed in an isolated manner from one another by partition walls between a front substrate and a rear substrate, at least one of two substrates being transparent, and, in which the image display media, to which an electrostatic field is applied, are made to move so as to display an image by means of Coulomb's force and so on. As one example of such image display device, in order to improve a visibility by making a color of the rear substrate or the partition walls inconspicuous in the case of an image displaying, a technique is known such that a color of a surface of the rear substrate, an overall portion or a surface of the partition walls, and so on is made for example to a color of one of the image display media (for example, Japanese Patent Laid-Open Publication No. 2002-139748).

However, among the techniques mentioned above, in the case that the overall portion of the partition walls is made to a color of one of the image display media, especially in the case that the overall portion of the partition walls is formed by a dark color such as black, if a pigment or a dye having a dark color such as black is blended in the resist, there occurs a drawback such that a light transmission property of the resist used for forming the partition walls is deteriorated. In this manner, if a light transmission property of the resist is deteriorated, there are drawbacks: such that a light is not evenly exposed to a portion at which the partition walls are to be formed by exposing and curing, when the exposure is performed through the mask; such that a possibility for causing a insufficient development, in which the partition walls are not formed according to the pattern, becomes high especially when forming high partition walls; and such that a sufficient adhesion property between the formed partition walls and the substrate can not be obtained (tasks of a third aspect of the invention).

DISCLOSURE OF INVENTION

An object of the first aspect of the invention is to eliminate the drawbacks mentioned above and to provide a method of manufacturing an image display panel and an image display panel manufactured according to the method mentioned above, which can improve an adhesion property between the substrate and the partition walls, obtain an excellent result even in an endurance test, and easily remove the image display media remaining on the partition walls.

According to the first aspect of the invention, a method of manufacturing an image display panel, having one or more cells formed in an isolated manner from one another by partition walls and accommodating image display media and a plurality of image display elements, in which the image display media are sealed between opposed two substrates, at least one of the two substrates being transparent, and, in which the image display media, to which an electrostatic field is applied, are made to move so as to display an image, is characterized in that the improvement comprises the steps of: manufacturing a substrate with the partition walls on one substrate; applying an adhesive mixture obtained by mixing a photo-curing resin and a heat-hardening resin on the partition walls; and then connecting the other substrate to the partition walls through the adhesive mixture.

As preferred examples of the method of manufacturing the image display panel according to a first aspect of the invention, there are cases: such that a composition of the adhesive mixture is 1-80 wt % of the photo-curing resin and 20-99 wt % of the heat-hardening resin; such that the photo-curing resin includes a photoinitiator and the heat-hardening resin includes a hardening agent; such that the image display media are sealed between the partition walls by: applying the adhesive mixture on the partition walls of the substrate with the partition walls; photo-curing the adhesive mixture once; filling the image display media between the partition walls; and connecting the other substrate to the partition walls by performing a heat-hardening under a pressurized state; and such that the image display media remaining on the partition walls are removed, after filling the image display media between the partition walls and before connecting the other substrate to the partition walls.

According to the first aspect of the invention, an image display panel is characterized in that the improvement is manufactured according to the method of manufacturing the image display panel mentioned above.

An object of the second aspect of the invention is to eliminate the drawbacks mentioned above and to provide a method of manufacturing an image display panel and an image display panel manufactured according to the method mentioned above, which can improve an adhesion property between the substrate and the partition walls and obtain an excellent result even in an endurance test.

According to the second aspect of the invention, a method of manufacturing an image display panel, having one or more cells formed in an isolated manner from one another by partition walls and accommodating image display media and a plurality of image display elements, in which the image display media are sealed between opposed two substrates, at least one of the two substrates being transparent, and, in which the image display media, to which an electrostatic field is applied, are made to move so as to display an image, is characterized in that the improvement comprises the steps of: manufacturing a substrate with the partition walls by forming the partition walls on one substrate; performing a washing by a dry treatment with respect to the thus manufactured substrate with the partition walls; applying an adhesive on the partition walls; and connecting the other substrate to the partition walls through the adhesive.

As preferred examples of the method of manufacturing the image display panel according to a second aspect of the invention, there are cases: such that the washing by the dry treatment is performed with respect to the other substrate, before connecting the other substrate to the partition walls of the substrate with the partition walls; such that after performing the washing by the dry treatment with respect to the substrate with the partition walls, the image display media are filled between the partition walls before the adhesive is applied on the partition walls or after the adhesive is applied on the partition walls; such that after filling the image display media between the partition walls, the washing by the dry treatment is performed with respect to the substrate with the partition walls under such a state that the image display media are filled between the partition walls; and such that the washing by the dry treatment is performed by a washing method according to a treatment selected from UV ozone treatment using a low pressurized mercury lamp, UV ozone treatment using an excimer lamp, low pressurized plasma treatment, atmospheric plasma treatment, and corona treatment.

According to the second aspect of the invention, an image display panel is characterized in that the improvement is manufactured according to the method of manufacturing the image display panel mentioned above.

An object of the third aspect of the invention is to eliminate the drawbacks mentioned above and to provide a method of an image display panel and an image display panel manufactured according to the method mentioned above, having a rapid response due to a dry type, an inexpensive cost and an excellent stability, which can further form the partition walls in which an excellent wall pattern can be obtained since an insufficient development is not caused and in which an adhesion property to the substrate can be maintained.

According to the third aspect of the invention, a method of manufacturing an image display panel, in which particles or liquid powders are sealed in cells formed in an isolated manner from one another by partition walls between opposed two substrates, at least one of the two substrates being transparent, and, in which the particles or the liquid powders, to which an electrostatic field is applied, are made to move so as to display an image, is characterized in that the improvement comprises the steps of: manufacturing the partition walls on one substrate by means of a pale color resist; applying an adhesive colored by a dark color on the partition walls; and connecting the other substrate to the partition walls through the adhesive.

Moreover, as preferred examples of the method of manufacturing the image display panel according to a second aspect of the invention, there are cases: such that the adhesive includes a filler having an average particle diameter of 0.5-20 µm; such that a thickness of the adhesive is 0.5-20 µm; such that the thickness of the adhesive is same as the average particle diameter of the filler; such that the dark color of the adhesive is black; and such that the pale color resist forming the partition walls is transparent or translucent.

According to the third aspect of the invention, an image display panel is characterized in that the improvement is manufactured according to the method of manufacturing the image display panel mentioned above.

BEST MODE FOR CARRYING OUT THE INVENTION

Figure 1:
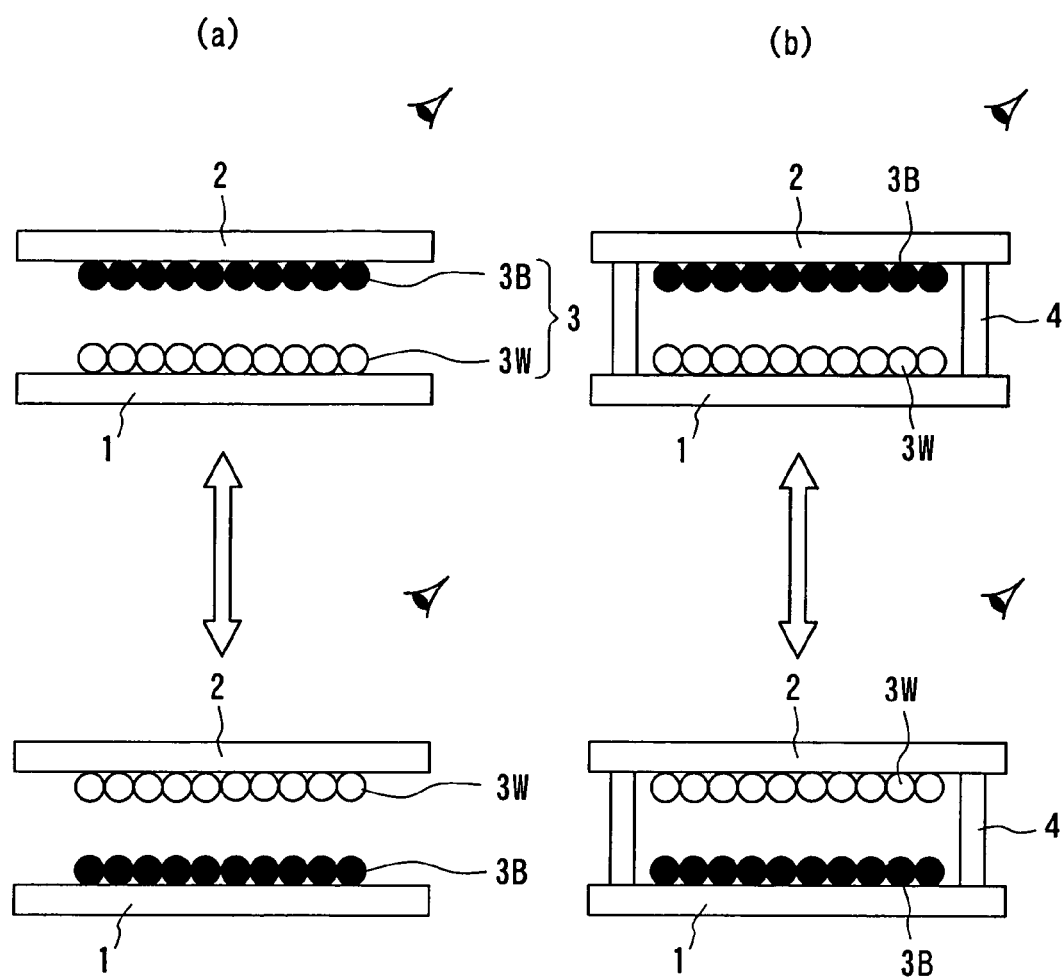
FIGS. 1a and 1b are schematic views respectively showing one example of the image display panel according to the invention.
Figure 2:
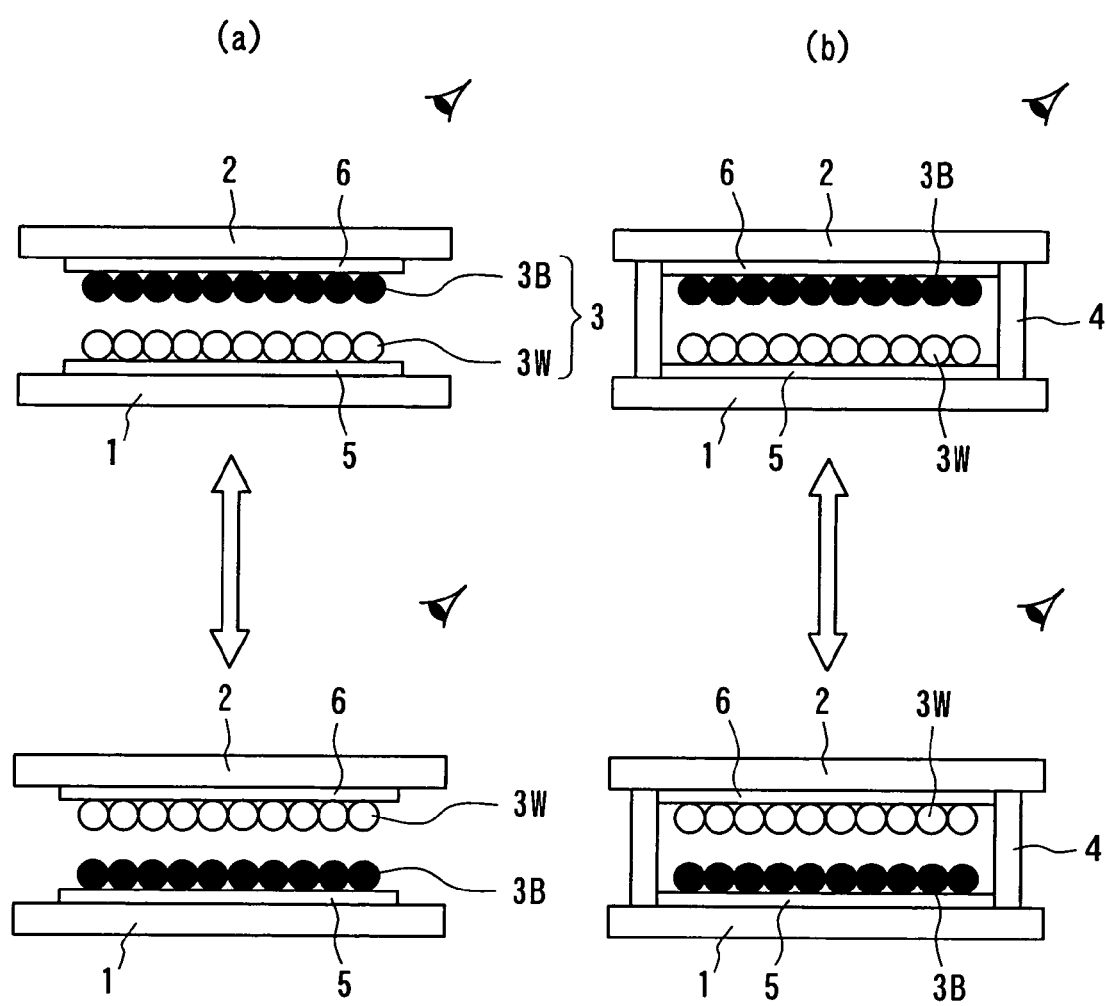
FIGS. 2a and 2b are schematic views respectively illustrating another example of the image display panel according to the invention.
Figure 3:
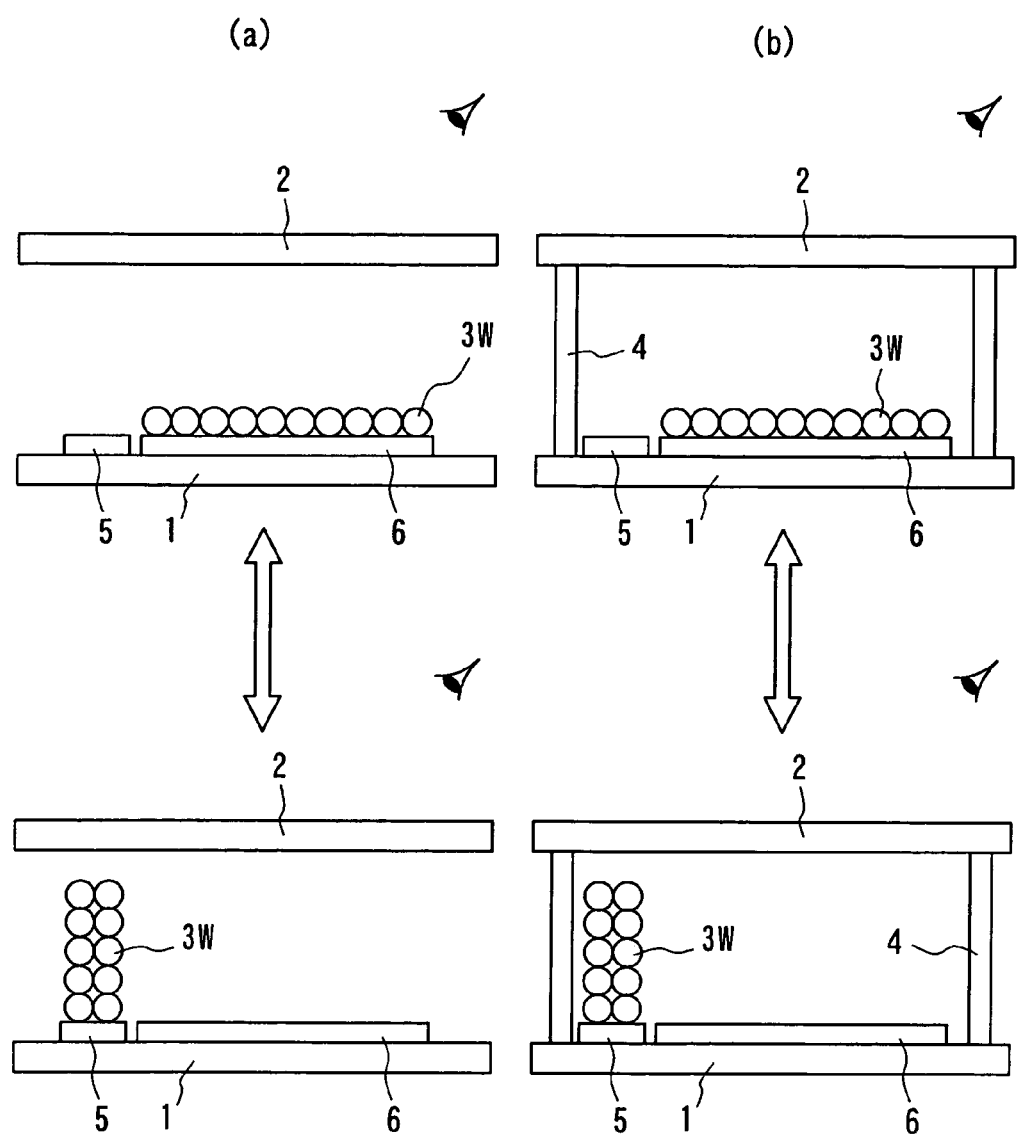
FIGS. 3a and 3b are schematic views respectively depicting still another example of the image display panel according to the invention.

One example of the image display panel according to the invention will be explained with reference to FIGS. 1a and 1b-FIGS. 3a and 3b.

In the examples shown in FIGS. 1a and 1b, at least two or more groups of image display media 3 having different colors and consisting of at least one or more groups of particles (here, a white particle 3W and a black particle 3B are shown) are moved in a perpendicular direction with respect to substrates 1 and 2, in accordance with an electric field applied from electrodes which are arranged outside of the substrates 1 and 2, so as to display a black color by viewing the black particles 3B to an observer or so as to display a white color by viewing the white particles 3W to the observer. In the example shown in FIG. 1b, a display cell is formed by arranging for example grid-like partition walls 4 between the substrates 1 and 2, in addition to the example shown in FIG. 1a.

In the examples shown in FIGS. 2a and 2b, at least two or more groups of image display media 3 having different colors and consisting of at least one or more groups of particles (here, a white particle 3W and a black particle 3B are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black particles 3B to an observer or so as to display a white color by viewing the white particles 3W to the observer. In the example shown in FIG. 2b, a display cell is formed by arranging for example grid-like partition walls 4 between the substrates 1 and 2, in addition to the example shown in FIG. 2a.

In the examples shown in FIGS. 3a and 3b, at least one group of image display media 3 having a color and consisting of at least one or more groups of particles (here, a white particle 3W) are moved in a parallel direction with respect to substrates 1 and 2, in accordance with an electric field generated by applying a voltage between the electrode 5 arranged to the substrate 1 and the electrode 6 arranged to the substrate 2, so as to display a white color by viewing the white particles 3W to an observer or so as to display a color of the electrode 6 or the substrate 1 by viewing a color of the electrode 6 or the substrate 1 to the observer. In the example shown in FIG. 3b, a display cell is formed by arranging for example grid-like partition walls 4 between the substrates 1 and 2, in addition to the example shown in FIG. 3a.

The above explanations can be applied to a case such that the white particles 3W are substituted by white liquid powders or a case such that the black particles 3B are substituted by black liquid powders.

A feature of the method of manufacturing the image display panel according to the first aspect of the invention is that, in the case of applying an adhesive on the partition walls 4 formed on one substrate (one of the front substrate 2 and the rear substrate 3) and connecting the other substrate to the partition walls 4 through the adhesive, use is made of an adhesive mixture obtained by mixing a photo-curing resin and a heat-hardening resin as the adhesive. As a result, an adhesion force between the substrates and the partition walls can be further improved, and, an excellent result can be obtained even in an endurance test. Further, in the preferred example using the adhesive mixture as the adhesive (mentioned below), it is possible to remove easily the image display media remaining on the partition walls 4.

FIGS. 4a-4e are schematic views respectively explaining one example of the method of manufacturing the image display panel according to the first aspect of the invention. At first, previously, the partition walls 4 are formed on one of the front substrate 2 and the rear substrate 1 (here, front substrate 2), and the substrate with the partition walls (it is sometimes an electrode substrate with the partition walls in which the electrode is arranged on the substrate) is manufactured. As a method of forming the partition walls 4, use is made of a method comprising the steps of: arranging a dry-film on one substrate; exposing the dry-film by using a mask into a predetermined pattern; developing; and washing, by means of for example a photo-resist method.

Figure 4:
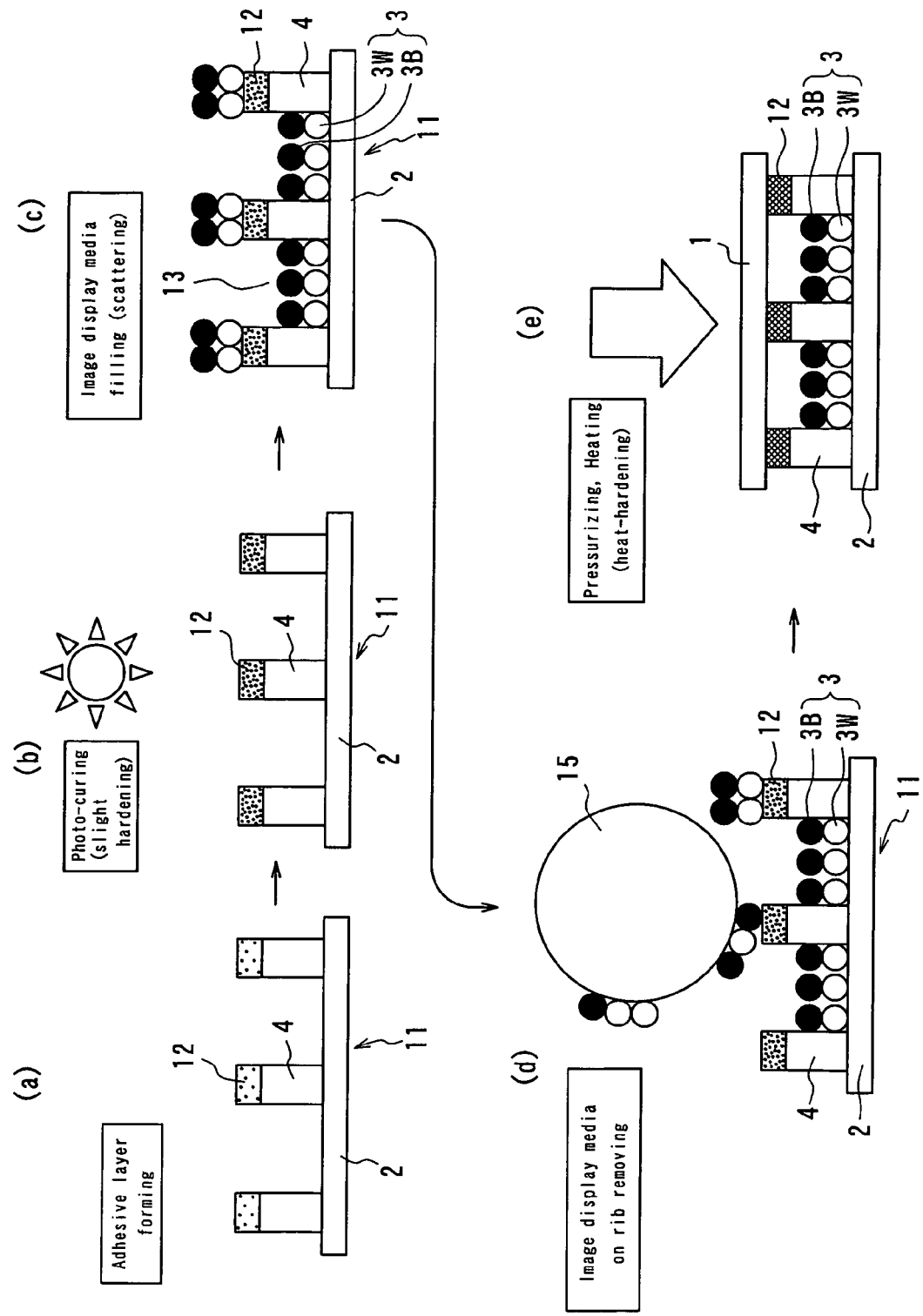
FIGS. 4a-4e are schematic views respectively explaining one example of the method of manufacturing the image display panel according to the first aspect of the invention.

Then, as shown in FIG. 4a, an adhesive layer 12 is formed on the partition walls 4 of the substrate 11 with the partition walls. As the adhesive consisting of the adhesive layer 12, use is made of an adhesive mixture obtained by mixing a photo-curing resin and a heat-hardening resin, both on the market. A mixing ratio between the photo-curing resin and the heat-hardening resin is not particularly limited, but it is preferred that a composition of the adhesive mixture is 1-80 wt % of the photo-curing resin and 20-99 wt % of the heat-hardening resin. The reasons are as follows. If the photo-curing resin is less than this range, a track remains after a light irradiation and it is not possible to remove the image display media. If the photo-curing resin exceeds this range, an adhesion force is not generated when connecting the substrate. In addition, it is preferred that the photo-curing resin includes a photoinitiator and the heat-hardening resin includes a hardening agent. Hereby, it is possible to further improve an effect of the present invention.

Then, as shown in FIG. 4b, a light corresponding to the photo-curing resin consisting of the adhesive layer 12 such as an ultraviolet ray, a visible light, an X-ray, an electron beam and so on is irradiated to the adhesive layer 12 so as to perform a slight hardening. Then, as shown in FIG. 4c, the image display media 3 (here, the white particles 3W and the black particles 3B) are filled in a cell 13 formed by the partition walls 4. As a method of filling the image display media 3, use is made of any known methods and use is made of a free-fall method as one example. Then, as shown in FIG. 4d, residual image display media 3 on the partition walls 4 are removed by using a slight adhesion roll 15 (or a slight adhesion sheet).

In this example, the adhesive layer 12 consists of the adhesive mixture of the photo-curing resin and the heat-hardening resin, and it has both properties of the photo-curing property and the heat-hardening property. Therefore, if the adhesive layer 12 is slightly cured by a light as shown in FIG. 4b, the adhesive layer 12 is made to a film and a surface tackiness and so on can be reduced. As a result, when the residual image display media 3 on the partition walls 4 are removed as shown in FIGS. 4c and 4d, the residual image display media 3 stacked on the partition walls 4 are not fixed to the partition walls 4, and thus it is possible to easily remove the residual image display media 3 stacked on the partition walls 4 during a filling of the image display media 3.

Here, as the photo-curing resin, use is made of, among radical polymerization series, light radical generating agents such as 1-6 functional acrylate monomer, epoxy acrylate, urethan acrylate, polyester acrylate, oligomer such as unsaturated polyester resin, benzophenone series, acetophenone series, thioxanthene series or phesphine oxide series, and, use is made of, among cation polymerization series, glycidyl ether series, alicyclic epoxy series, glycidyl ester series, vinyl ether series, epoxy resin such as glycidyl amine series, aromatic diazonium salt as photooxidation generating agent, aromatic sulfonium salt, aromatic iodonium salt, composite of metallocene series and silicide aluminum complex.

As the heat-hardening resin, use is made of epoxy series resin, acrylic series resin, polyurethane series and so on. Among them, it is preferred to use epoxy series resin. As the epoxy series agent, use is made of epoxy resin such as glycidyl ether series, alicyclic epoxy series, glycidyl ester series, vinyl ether series, glycidyl amine series, and so on. As the hardening agent, use is made of polyamine series, modified polyamine series, imidazole class, third class amine, triphenyl phosphine, phosphonium salt, cyanogens diamide, organic acid dihydrazide, N,N-dimethyl urea derivative, acid anhydride series, polyphenol series, amine adduct series, microcapsule type, imidazole series, transition metal complex of aromatic amine compound, phosphorous ylide series, vinyl ether block carboxylic acid, onium salt series cation polymerization catalyst, aluminum complex composite series cation polymerization catalyst, polythiol series and so on. Among them, it is preferred to use the heat-hardening agent.

As a combination of the photo-curing resin and the heat-hardening resin, it is preferred to combine acrylic series resin as light radical polymerization series and epoxy resin as heat-hardening series. In addition, use may be made of resin including both of acrylic group, which performs light radical polymerization in one molecule, and glycidyl group, which performs a heat-hardening. According to need, it is possible to add reaction accelerator, liquid rubber, elastomeric modifying agent such as rubber fine particles and so on, silane coupling agent, filler, flame retardant, and diluents.

Finally, as shown in FIG. 4e, the rear substrate 1 as the other substrate is stacked on the partition walls 4 through the adhesive layer 12, and a heat press, which performs pressurizing and heating, is performed under such a condition. Thereby, the heat-hardening resin consisting of the adhesive layer 12 is hardened, and it is possible to obtain an excellent adhesive force. In this manner, a designed image display panel can be obtained.

A feature of the method of manufacturing the image display panel according to the second aspect of the invention is that, prior to connect the other substrate to the partition walls 4 formed on one substrate (one of the front substrate 2 and the rear substrate 1) through the adhesive, the washing by the dry treatment is performed with respect to an overall portion of the substrate with the partition walls. As a result, it is possible to improve the adhesion force of the adhesive and it is possible to obtain a better result even in the endurance test. Hereinafter, this feature will be explained in detail.

FIGS. 5a-5e are schematic views respectively explaining one example of the method of manufacturing the image display panel according to the second aspect of the invention. At first, previously, the partition walls 4 are formed on one of the front substrate 2 and the rear substrate 1 (here, front substrate 2), and the substrate with the partition walls (it is sometimes an electrode substrate with the partition walls in which the electrode is arranged on the substrate) is manufactured. As a method of forming the partition walls 4, use is made of a method comprising the steps of: arranging a dry-film on one substrate; exposing the dry-film by using a mask into a predetermined pattern; developing; and washing, by means of for example a photo-resist method.

Figure 5:
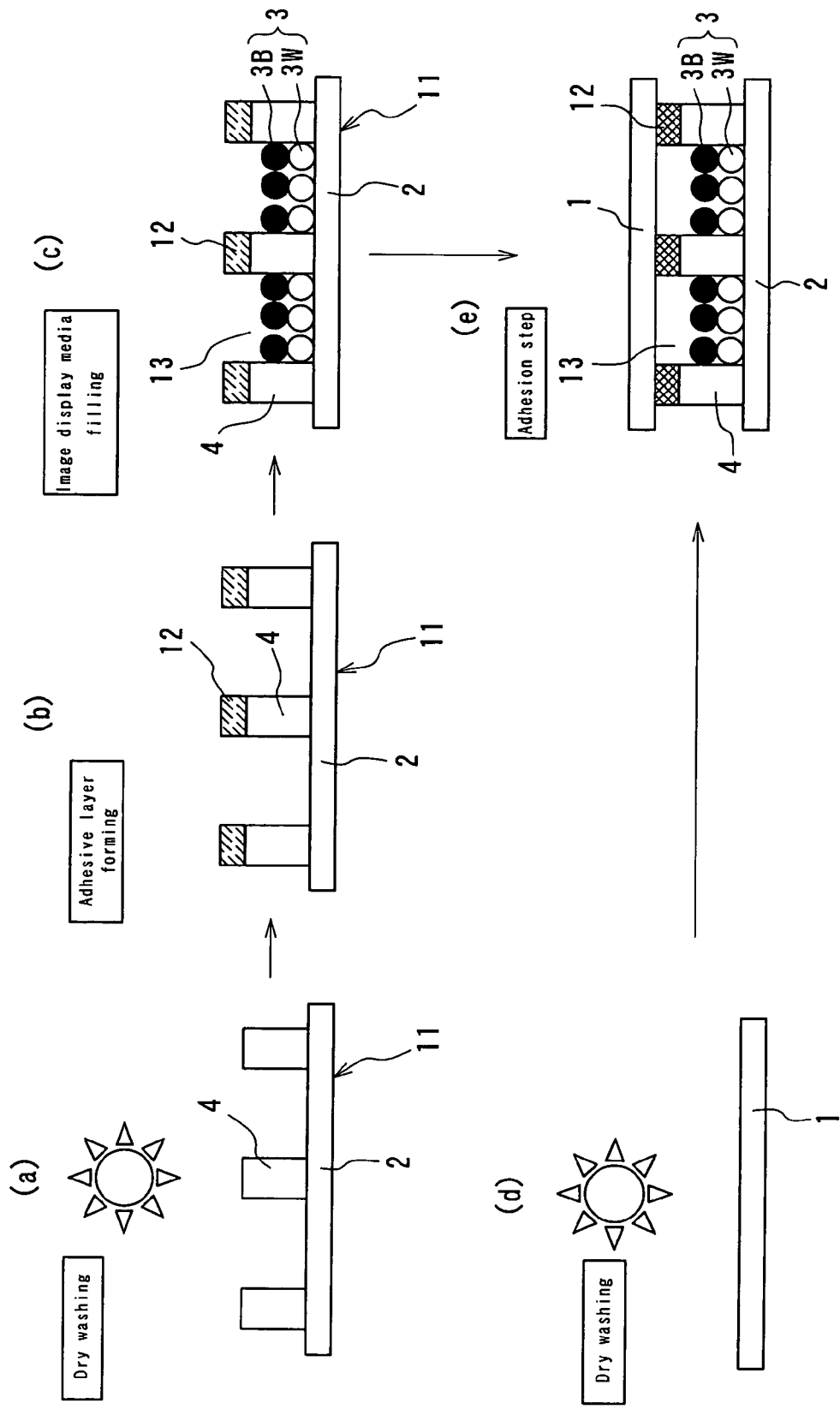
FIGS. 5a-5e are schematic views respectively explaining respective steps in the method of manufacturing the image display panel according to the second aspect of the invention.

Then, as shown in FIG. 5a, a washing is performed with respect to the thus obtained substrate 11 with the partition walls (or electrode substrate with the partition walls) by means of a dry washing. Here, as the washing by the dry treatment means, it is preferred to use UV ozone treatment using a low pressurized mercury lamp, UV ozone treatment using an excimer lamp, low pressurized plasma treatment, atmospheric plasma treatment, or corona treatment.

Then, as shown in FIG. 5b, the adhesive layer 12 is formed on the partition walls 4. A kind of the adhesive to be used and a forming method of the adhesive layer 12 are not particularly limited, and it is possible to use the known adhesive and the known forming method. As one example, as the adhesive, use is made of the heat-hardening resin, and as the forming method, use is made of a screen printing method or a roll coater method. Then, as shown in FIG. 5c, the image display media 3 (here, the white particles 3W and the black particles 3B) are filled in the cells 13 formed by the partition walls 4. As a method of filling the image display media 3, use is made of any known methods and use is made of a free-fall method as one example. It should be noted that a performing order of the adhesive layer forming step shown in FIG. 5b and the image display media filling step shown in FIG. 5c are not limited as mentioned above, and the steps mentioned above can be reversed.

In addition to the respective steps mentioned above, as shown in FIG. 5d, it is preferred to perform the washing by the dry treatment with respect to the other substrate (here the rear substrate 1) concurrently. The washing by the dry treatment is the same as the method mentioned above. After that, as shown in FIG. 5e, the rear substrate 1 as the other substrate is connected to the partition walls through the adhesive layer 12, and a designed image display panel can be obtained.

A feature of the method of manufacturing the image display panel according to the third aspect of the invention is that a method of manufacturing the colored partition walls is improved and the partition walls can be formed precisely in a predetermined pattern without generating a development failure. Hereinafter, the method of manufacturing the image display panel according to the third aspect of the invention will be explained.

FIGS. 6a-6c are schematic views respectively explaining respective steps in the method of manufacturing the image display panel according to the third aspect of the invention. The method of manufacturing the image display panel according to the third aspect of the invention will be explained with reference to FIGS. 6a-6c. At first, as shown in FIG. 6a, the partition walls are formed on one substrate by using a pale color resist. In this example, partition walls 22 are formed on an ITO glass substrate 21 consisting of the transparent front substrate 2 at an image display side. The formation of the partition walls 22 are performed, as is the same as the known one, by: applying a predetermined resist liquid on the ITO glass substrate 21 or arranging a predetermined dry-film resist on the ITO glass substrate 21; and performing the exposure by using a mask and the washing. Moreover, as a color of the partition walls 22, use is made of any colors if it is paler than a color of the adhesive having a dark color as mentioned blow, but it is preferred to be transparent or translucent.

Then, as shown in FIG. 6b, an adhesive having a dark color is applied on the partition walls 22 so as to form an adhesive layer 23. As the applying method of the adhesive, use is made of the known offset printing method, film transferring method and so on. The adhesive layer 23 includes a dark pigment or a dark dye so as to make its color darker than that of the partition walls 22, and also includes fillers 24 made of spacer particles. In this example, it is preferred that the adhesive layer 23 having a dark color is made of a black adhesive including a black pigment or dye. Moreover, it is preferred that a thickness of the adhesive layer 23 is 0.5-20 μm. The reasons for limiting the thickness of the adhesive layer 23 to 0.5-20 μm are as follows. If the thickness is less than 0.5 μm, a desired color is not sometimes obtained and an adhesion force is sometimes decreased. If the thickness exceeds 20 μm, the adhesive is sometimes protruded from a width of the partition walls and a transferring property is deteriorated.

In this case, the reason for including the fillers 24 in the adhesive layer 23 is that a thickness of the adhesive layer 23 is maintained and a color is also preserved by including the fillers 24, which are not broken under the pressurized state for a connecting step mentioned below, in the adhesive layer 23. From this viewpoint, as shown in FIG. 6b by a partially enlarged view, it is preferred that one layer of the fillers 24 is aligned in the adhesive layer 23 by making the thickness of the adhesive layer 23 equal to an average particle diameter of the fillers 24.

Then, as shown in FIG. 6c, the other substrate i.e. a substrate 25 as the opposed substrate 2 in this example is pressed to the partition walls 4 through the adhesive layer 23, and the substrate 25 and the partition walls 22 are connected. In this manner, the colored partition walls, which are an object of the invention, can be obtained from the partition walls 22 and the adhesive layer 23. In this case, since the partition walls 22 are formed by using the pale color preferably transparent resist, it is possible to form the partition walls 22 in a highly precise manner, as is the same as the known one. In addition, it is possible to obtain a predetermined colored partition walls by using the dark color adhesive layer 23.

In this example, a scattering for filling the image display media 3 between the ITO glass substrate 21 and the substrate 25 is performed. This scattering step of the image display media 3 can be performed at any timing of before and after the adhesive applying step. Moreover, as the adhesion method by using the adhesive, use is made of a method of heat-hardening the adhesive layer 23 and a method of UV-hardening the adhesive layer 23. Further, in the example mentioned above, the adhesive layer 23 is arranged to a side of the opposed substrate 1. However, the present invention can be applied in the same manner to the case such that the adhesive layer 23 is arranged at a side of the front substrate 2 or to the case such that the partition walls 22 having a half length are previously formed on both of the opposed substrate 1 and the front substrate 2 and the partition walls 22 are connected with each other by using a predetermined adhesive layer 23 mentioned above. Further, it is preferred that a black color is used as an example of the dark color and a transparent color or a translucent color is used as an example of the pale color. However, the present invention can be applied to any color combination even if a color relation between the partition walls 22 and the adhesive layer 23 can be maintained.

Hereinafter, a resist material for forming the partition walls will be explained.

The resin material includes a photo-curing resin as an main ingredient, and sometimes includes heat-hardening resin, inorganic powders, solvent, additives and so on. As the photo-curing resin, use is preferably made of acrylic series resin, but any resins may be used if it is cured by a light such as ultraviolet ray and so on. As the inorganic powders, use is made of ceramic powders, glass powders or a combination of one or more kinds of them.

Typical ceramic powders include ceramic oxides such as $ZrO_2$, $Al_2O_3$, CuO, MgO, $TiO_2$, ZnO and so on, and ceramic non-oxides such as SiC, AlN, $Si_3O_4$ and so on.

Typical glass powders include a substance obtained by melting raw materials having $SiO_2$, $Al_2O_3$, $B_2O_3$, $Bi_2O_3$, ZnO and so on, and cooling and grinding the melted raw materials. In this case, it is preferred that a glass transition point Tg is 300-500° C. In this glass transition temperature range, since the firing step can be performed at a relatively low temperature, there is a merit that resin damage is small.

Here, it is preferred that a particle size distribution Span of the inorganic powders, which is defined by the following formula, is not more than 8 more preferably not more than 5:

$$\mathrm{Span} = (d(0.9) - d(0.1))/d(0.5);$$

(here, d(0.5) means a value of the particle size expressed by μm wherein an amount of the particles having the particle size larger than or smaller than this value is 50%, d(0.1) means a value of the particle size expressed by Am wherein an amount of the particles having the particle size smaller than this value is 10%, and d(0.9) means a value of the particle size expressed by tm wherein an amount of the particles having the particle size smaller than this value is 90%).

By setting a value of Span to not more than 8, it is possible make a size of the inorganic powders in the material even. Therefore, if the processes of application to hardening for the material are repeated to make a lamination, it is possible to form accurately the partition walls.

Moreover, it is preferred that the average particle size d(0.5) of the inorganic powders in the material is 0.1-20 μm more preferably 0.3-10 μm. By doing so, it is also possible to form accurately the partition walls if the above processes are repeated to make a lamination.

Here, the particle diameters distribution and the particle size mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameters distribution.

In the present invention according to the invention, it is defined that the particle diameter and the particle diameters distribution are obtained by a volume standard distribution. Specifically, the particle diameter and the particle diameters distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

As the heat-hardening resin used in the case that the heat-hardening resin is included in the photo-curing resin as a main ingredient of the resist material for the partition walls, use is made of any resins if it includes the inorganic powders mentioned above and predetermined partition walls can be formed. If required solid state properties of the partition walls are considered, it is preferred to use a resin having a high molecular weight and a high glass transition point. For example, it is preferred to use resins of acrylic-series, styrene-series, epoxy-series, urethane-series, polyester-series, and urea-series and it is especially preferred to use the resins of acrylic-series, epoxy-series, urethane-series, and polyester-series.

As the solvent added in the resist material for the partition walls, use is made of any solvent if it can dissolve the inorganic powders and the resin used for the resist material. Typical examples of such a solvent are aromatic solvents such as ester phthalate, toluene, xylene, benzene; alcoholic solvents such as oxy-alcohol, hexanol, octanol; and ester solvents such as ester acetate and so on.

In addition, according to need, it is possible to add dye, polymerization prevention agents, plasticizer, gum, dispersant, oxidation inhibitor, hardening agents, hardening accelerator, and sedimentation prevention agents into the resist aterial for the partition walls.

Hereinafter, respective members constituting the image display panel according to the invention will be explained in detail.

With regard to the substrate, at least one substrate must be transparent front substrate 2 capable of recognizing the displaying color from outside of the display panel, and a material with large transmission factor of visible light and with excellent heat resistance is preferable. The rear substrate 1 may be transparent or opaque. The presence of flexibility as the substrate is selected appropriately by the usage, for example, the flexible materials are selected for the usage as an electronic paper and so on, and materials having no flexibility are selected for the usage as display units for portable devices such as cellular phones, PDAs, and notebook personal computers. Examples of the substrate material include polymer sheets such as polyethylene terephthalate, polymer sulfone, polyethylene, or polycarbonate, and inorganic sheets such as glass, quartz or so. The thickness of the substrate is preferably 2 to 5000 μm, more preferably 5 to 1000 μm. When the thickness is too thin, it becomes difficult to maintain strength and distance uniformity between the substrates, and when the thickness is too thick, a sharpness and a contrast as a display function are decreased and thus it lacks a flexibility for the electric paper application.

With regard to the electrodes, in the examples shown in FIGS. 3a and 3b, both of display electrode 6 and the opposed electrode 5 having different potentials are arranged to the rear substrate 1 opposed to the front substrate 2. As the other electrode arrangement, in the examples shown in FIGS. 1a, 1b and FIGS. 2a, 2b, the display electrode 6 is arranged to the front substrate 2 and the opposed substrate 5 is arranged to the rear substrate 1. In this case, it is necessary to use a transparent electrode as the display electrode 6. In the examples shown in FIGS. 3a and 3b, opaque electrode can be used for both of the display electrode 6 and the opposed electrode 5, and thus it is possible to use inexpensive and low resistance metal electrode such as copper, aluminum and so on. In this case, the applied outer voltage may be superimposed with a direct current or an alternate current. With respect to respective electrodes, it is preferred to form an insulation coating layer so as not to leak a charge of the charged particles. As the coating layer, it is particularly preferred to use a positively charged resin with respect to the negatively charged particles and to use a negatively charged resin with respect to the positively charged particles, since a charge of the particles is difficult to leak. Moreover, the electrode may be arranged according to need.

Then, the liquid powders used as the image display media for the displaying in the image display panel will be explained. As a name of the liquid powders utilized in the image display apparatus according to the invention, the applicant has the right of "electric liquid powders (trade mark)".

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of-powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention are a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the image display device according to the invention, a solid material is used as a dispersant.

The image display panel which is a target of the present invention has a construction such that the liquid powders composed of a solid material stably floating as a dispersoid in a gas and exhibiting a high fluidity in an aerosol state are sealed between opposed two substrates, wherein one of two substrates is transparent, as the image display media. Such liquid powders can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the image display device according to the invention, the liquid powders used in a state such that a solid material is relatively and stably floating as a dispersoid in a gas.

Then, particles for the image display media (hereinafter, sometimes refer to particles) constituting the image display media in the image display panel according to the invention will be explained. The particles for the image display media are used as the image display media constructed by only the particles for the image display media, or the image display media constructed by mixing them with the other particles, or the image display media constructed by controlling them into the liquid powders.

The particles include resin as a main ingredient and, according to need, charge control agent, coloring agent, inorganic additives, as is the same as the known one. Hereinafter, typical examples of resin, charge control agent, coloring agent, additive and so on will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers are preferred.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, indunsren brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Prussian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

Moreover, it is preferred to set the average particle diameter $d(0.5)$ of the particles used for the image display media in the image display panel according to the invention to 0.1-20 μm, and to make the particles even and regulated shapes. If the average particle diameter exceeds this range, the image clearness sometimes deteriorated, and, if the average particle diameter is smaller than this range, an agglutination force between the particles becomes larger and the movement of the particles is prevented.

Further, in the present invention, as for the particle diameter distribution of respective particles, it is preferred that particle diameter distribution Span of the particles, which is defined by the following formula, is not more than 5 preferably not more than 3:

$$\mathrm{Span} = (d(0.9) - d(0.1))/d(0.5);$$

(here, $d(0.5)$ means a value of the particle size expressed by μm wherein an amount of the particles having the particle size larger than or smaller than this value is 50%, $d(0.1)$ means a value of the particle size expressed by μm wherein an amount of the particles having the particle size smaller than this value is 10%, and $d(0.9)$ means a value of the particle size expressed by μm wherein an amount of the particles having the particle size smaller than this value is 90%).

If the particle size distribution Span of the particles is set to not more than 5, the particle size becomes even and it is possible to perform an even particle movement.

Further, as a correlation between the particles, it is preferred to set a ratio of $d(0.5)$ of the particles having smallest diameter with respect to $d(0.5)$ of the particles having largest diameter to not more than 50 preferably not more than 10. Even if the particle diameter distribution Span is made smaller, the particles having different charge properties with each other are moved in the opposite direction. Therefore, it is preferred that the particle diameters are formed closely with each other and equivalent amounts of the particles are easily moved in the opposite direction. To this end, the above range is obtained.

Here, the particle diameters distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameters distribution.

In the present invention, it is defined that the particle diameter and the particle diameters distribution are obtained by a volume standard distribution. Specifically, the particle diameter and the particle diameters distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the particles is properly depend upon the measuring condition. However, it is understood that the charge amount of the particles used for the image display media in the image display panel is substantially depend upon an initial charge amount, a contact with respect to the partition walls, a contact with respect to the substrate, a charge decay due to an elapsed time, and specifically a saturation value of the particles during a charge behavior is a main factor.

After various investigations of the inventors, it is fond that an adequate range of the charged values of the particles used for the image display media can be estimated by performing a blow-off method utilizing the same carrier particles so as to measure the charge amount of the particles.

Further, in the present invention, it is important to control a gas in a gap surrounding the particles or the liquid powders as the image display media between the substrates, and a suitable gas control contributes an improvement of display stability. Specifically, it is important to control a humidity of the gap gas to not more than 60% RH at 25° C., preferably not more than 50% RH, more preferably not more than 35% RH.

The above gap means a gas portion surrounding the image display media obtained by substituting the electrodes 5, 6, an occupied portion of the image display media (particles or liquid powders) 3, an occupied portion of the partition walls 4 (portion existing the partition walls 4 forming incomplete cells) and a seal portion of the device from the space between the substrate 1 and the substrate 2.

A kind of the gap gas is not limited if it has the humidity mentioned above, but it is preferred to use dry air, dry nitrogen gas, dry helium gas, dry carbon dioxide gas, dry methane gas and so on. For example, it is important to perform the operations of filling the liquid powders and assembling the substrate under an atmosphere having a predetermined humidity and to apply a seal member and a seal method for preventing a humidity inclusion from outside of the device.

A distance between the substrates in the image display panel used for the image display device according to the invention may be controlled at any rate if the image display media can be moved and a contrast can be maintained. However, it is normally controlled to 10-500 µm preferably 10-200 µm.

It is preferred to control a volume occupied rate of the image display media in a space between the opposed substrates to 5-70 vol %, more preferably 5-60 vol %. If the volume occupied rate of the image display media exceeds 70 vol %, the particles become difficult to move, and if it is less than 5 vol %, a clear image display is not performed.

In the image display panel used in the image display device according to the invention, plural of the foregoing display elements are disposed in a matrix form, and images can be displayed. In the case of displaying arbitral color other than black and white, a color combination of the image display media (particles or the liquid powders) is suitably selected; In the case of full color display, three kinds of display elements, i.e., one group of display elements each having color plate of R (red), G (green) and B (blue) respectively and each having particles of black composes a set of disposed elements preferably resulting in the reversible image display panel having the sets of the elements.

EMBODIMENT

Then, examples and comparative examples are shown so as to explain the present invention further specifically. However, the present invention is not limited to the following examples and comparative examples.

[As to the First Aspect of the Invention]

Example 1

The partition walls 4 each having an opening portion of 300 µm□, a line width of 100 µm and a height of 100 µm were formed on an ITO glass substrate of 30 Ω/□ (corresponding to the front substrate 1, t=0.7 mm) by means of a photo-resist method so as to obtain the electrode substrate with the partition walls 11. Moreover, the adhesive mixture was obtained by mixing 10 g of TB3052 by Three Bond Co., Ltd., as the photo-curing resin and 10 g of TB2202 by Three Bond Co., Ltd., as the heat-hardening resin. Then, as shown in FIG. 4a, the adhesive mixture was applied on the partition walls 4 by using the roll coater method so as to form the adhesive layer 12.

Figure 6:
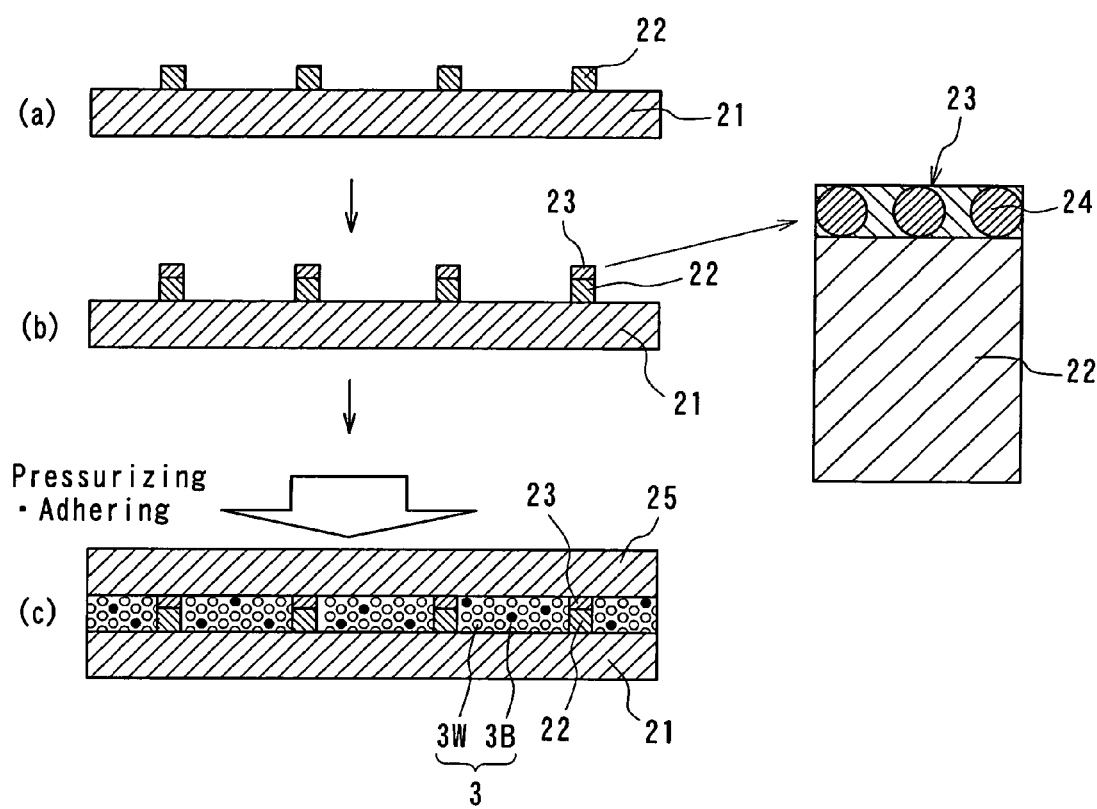
FIGS. 6a-6c are schematic views respectively explaining respective steps in the method of manufacturing the image display panel according to the third aspect of the invention.

Then, as shown in FIG. 4b, an ultraviolet light was irradiated to the adhesive layer 12 under 1000 mJ/cm$^2$ by using a high pressure mercury lamp so as to slightly harden the adhesive layer 12. Then, as shown in FIG. 4c, 6 g/m$^2$ of the white particles 3W and 6 g/m$^2$ of the black particles were filled in the cells 13 by using the free-fall method. Then, as shown in FIG. 4d, the residual particles 3W, 3B remaining on the partition walls 4 were removed by using the slight adhesion roll 15. In this case, a particle removed state is observed by means of a microscope, and it was determined by the naked eyes that a symbol ○ shows a complete particle remove and a symbol x shows an incomplete particle remove. The results are shown in the following Table 1.

Finally, as shown in FIG. 4e, an ITO glass substrate of 30 Ω/□ (corresponding to the rear substrate 1, t=0.7 mm), on which the electrode was arranged, was connected to the partition walls 4 in such a manner that the substrate was laminated to the partition walls through the adhesive layer 12 and the adhesive layer 12 was heat-hardened by utilizing the heat press. Conditions of the heat press were at 70° C. for 60 minutes under 10 MPa.

With respect to the thus obtained image display panel, an adhesion force was measured by a tensile test. As an estimate of the adhesion force, it was determined that a symbol ○ shows an example indicating the adhesion force of not less than 10 MPa and a symbol x shows an example indicating the adhesion force of less than 10 MPa. The results are shown in the following the following Table 1.

Example 2

The image display panel was manufactured as is the same as the example 1 except that 10 g of TB2210 by Three Bond Co., Ltd., was used as the heat-hardening resin and the conditions of the heat press were at 90° C. for 60 minutes under 10 MPa, and the estimate of the manufactured image display panel was performed as is the same as the example 1. The results are shown in the following Table 1.

Example 3

The adhesive layer 12 was formed on the partition walls 4 by using WR798 by Kyoritsu Chemical & Co,. Ltd., which was a mixture of the radical series photo-curing resin and the epoxy series heat-hardening resin. After that, an ultraviolet light was irradiated to the adhesive layer 12 under 2000 mJ/cm$^2$ by using a high pressure mercury lamp so as to slightly harden the adhesive layer 12. Then, the particle filling was performed as is the same as the example 1. As a result, the residual particles can be completely removed by using the above adhesive. Then, it was hardened by the heat press under 10 MPa at 120° C. for 60 minutes. Then, the image display panel was manufactured as is the same as the example 1 and the estimate of the manufactured image display panel was performed as is the same as the example 1. In this case, when the same tensile test as that of the example 1 was performed with respect to the thus obtained image display panel, a sufficient adhesion force could be obtained. The results are shown in the following Table 1.

Example 4

The image display panel was manufactured as is the same as the example 3 except that use was made of WR798H by Kyoritsu Chemical & Co,. Ltd., which was a mixture of the radical series photo-curing resin and the epoxy series heat-hardening resin. In this case, when the same tensile test as that of the example 1 was performed with respect to the image display panel, a sufficient adhesion force could be obtained. The results are shown in the following Table 1.

Comparative Example 1

The image display panel was tried to be manufactured as is the same as the example 1 except that only TB3052 by Three Bond Co., Ltd., which was the photo-curing resin, was used as the adhesive. As a result, in this comparative example 1, the residual particles could not be removed due to the tackiness of the adhesive, and the estimate of adhesive force could not be performed. The results are shown in the following Table 1.

Comparative Example 2

The image display panel was tried to be manufactured as is the same as the example 1 except that only TB2202 by Three Bond Co., Ltd., which was the heat-hardening resin, was used as the adhesive. As a result, in this comparative example 1, the residual particles could not be removed due to the tackiness of the adhesive, and the estimate of adhesive force could not be performed. The results are shown in the following Table 1.

Comparative Example 3

The image display panel was manufactured as is the same as the example 1 except that: only the heat-hardening resin (TB1571 by Three Bond Co., Ltd.), which was the hot-melt adhesive, was used; a drying at 120° C. for 30 minutes was performed after forming the adhesive layer 12 on the partition walls 4; and the conditions of the heat press were at 120° C. for 10 minutes under 10 MPa. Then, the estimate of the thus manufactured image display panel was performed as is the same as the example 1. The results are shown in the following Table 1.

Comparative Example 4

The image display panel was tried to be manufactured as is the same as the example 1 except that, as the adhesive, 18 g of TB3052 mentioned above was used as the photo-curing resin and 2 g of TB2202 mentioned above was used as the heat-hardening resin. As a result, the residual particles could be removed, but the substrate and the partition walls were not connected, so that the estimate of adhesion force could not be performed. The results are shown in the following Table 1.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Particle remove (visual observation) | | ○ | ○ | ○ | ○ | x | x | ○ | ○ |
| Adhesive force (MPa) | Initial stage | 12 | 14 | 16 | 18 | — | — | 11 | not connected |
|  | 80° C. × 500 hours | 15 | 16 | 18 | 19 | — | — | 10 | — |
|  | 60° C. × 90% RH × 1000 hours | 11 | 12 | 13 | 15 | — | — | 6 | — |
| Total estimate | | ○ | ○ | ○ | ○ | x | x | x | x |

From the results of Table 1, it is understood that the examples 1-4 according to the invention, in which the adhesive mixture obtained by mixing a photo-curing resin and a heat-hardening resin as the adhesive is used as the adhesive, can remove the residual particles completely, improve an adhesion force and obtain an excellent results even in the endurance test as compared with the comparative examples 1-4, in which the known adhesive other than the present invention is used. Moreover, it is understood that, in the comparative example 3, in which only the hot-melt adhesive is used, the residual particles can be removed completely, the image display panel can be manufactured and a sufficient adhesion force can be obtained at the initial stage, but an adhesion force becomes not greater than 10 MPa after 60° C.×90% RH×1000 hours and thus there is a drawback on durability.

Moreover, when the same experiments were performed with respect to the liquid powders, the results having the same tendency as those of the examples 1-4 and the comparative examples 1-4 could be obtained and it was confirmed that the present invention was effective to the liquid powders.

[As to the Second Aspect of the Invention]

Example 11

Figure 7:
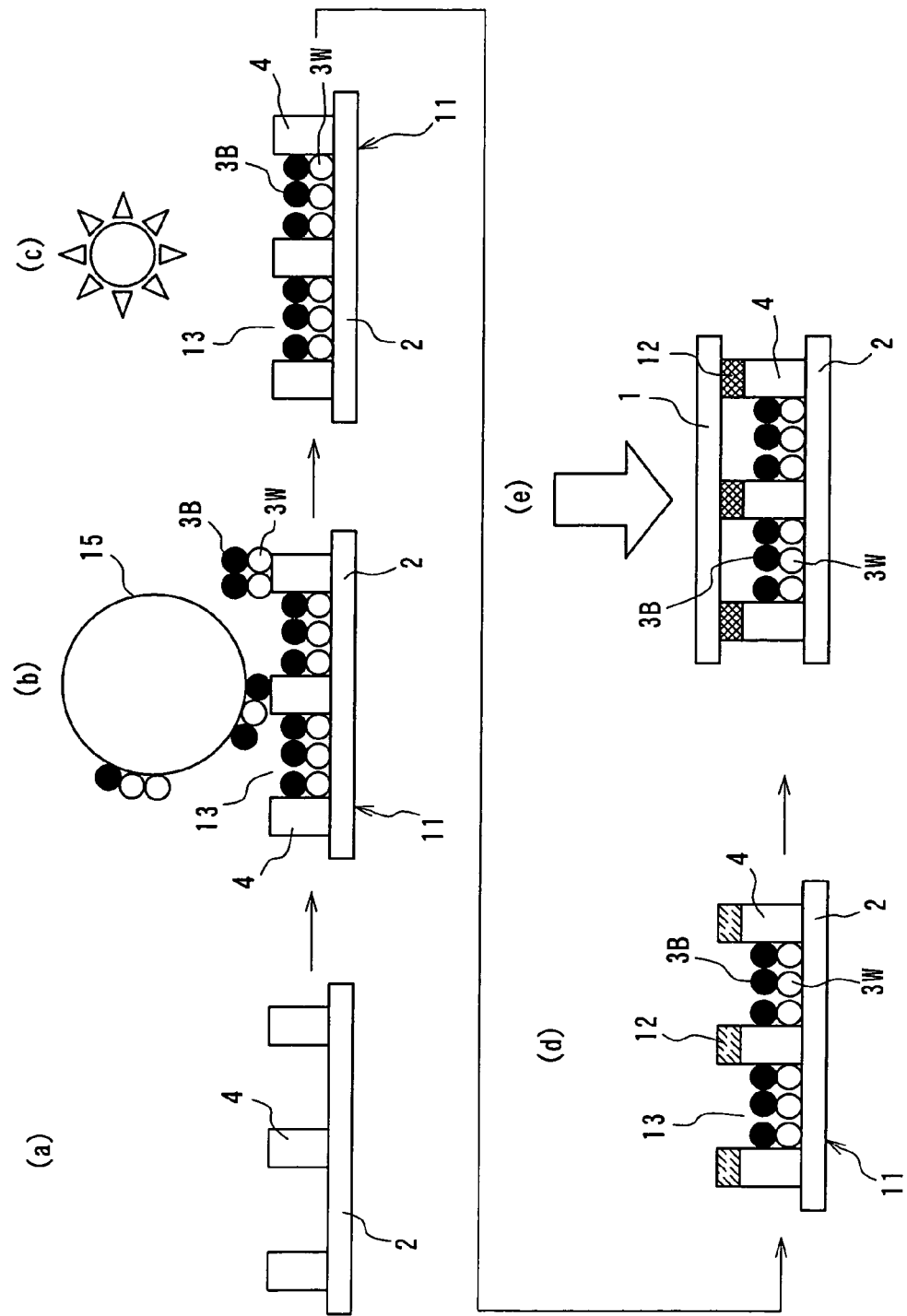
FIGS. 7a-7e are schematic views respectively explaining another example of the method of manufacturing the image display panel according to the second aspect of the invention.

The image display panel was manufactured according to respective steps shown in FIGS. 7a-7e. At first, as shown in FIG. 7a, the partition walls 4 each having an opening portion of 300 μm □, a line width of 100 μm and a height of 100 μm were formed on an ITO glass substrate of 30 Ω/□ (corresponding to the front substrate 2) by means of a photo-resist method so as to obtain the electrode substrate with the partition walls 11. Then, as shown in FIG. 7*b*, 6 g/m² of the white particles 3W and 6 g/m² of the black particles were filled in the cells 13 by using the free-fall method. Then, the residual particles remaining on the partition walls 4 were removed by using the slight adhesion roll 15 (or slight adhesion sheet).

After that, as shown in FIG. 7*c*, the washing by the dry treatment was performed under a condition of 2 minutes by means of a low pressure mercury lamp. As the low pressure mercury lamp, 25W×6 lights/OC-2506: UV ozone washing device by EYEGRAPHICS Co., Ltd., was used. Then, as shown in FIG. 7*d*, the adhesive was applied on the partition walls 4 by utilizing the roll coater method so as to form the adhesive layer 12. As the adhesive, HC1210 by Mitsui Chemical Inc. was used. Finally, as shown in FIG. 7*e*, the opposed substrate (corresponding to the rear substrate 1), on which the electrode washed by the same dry treatment was arranged, was connected to the partition walls 4 through the adhesive layer 12 by utilizing the heat press method. The conditions of the heat press method were at 120° C. for 60 minutes under 10 MPa.

With respect to the thus obtained image display panel, an adhesion force was measured by means of a tensile test. The adhesion force measurement was performed by measuring adhesion force after environment testing at an initial stage, at after 80° C.×500 hours elapsing and at after 60° C.×90% RH×1000 hours elapsing. As an estimate of the adhesion force, it was determined that a symbol ⊚ shows an example indicating the adhesion force of not less than 15 MPa, a symbol ○ shows an example indicating the adhesion force of not less than 10 MPa and a symbol x shows at least one example indicating the adhesion force of less than 10 MPa. The results are shown in the following Table 2.

Example 12

The image display panel was manufactured as is the same as the example 11 except that the washing by the dry treatment was performed for 5 minutes by means of the low pressure mercury lamp (25W×6 lights/ OC-2506: UV ozone washing device by EYEGRAPHICS Co., Ltd.). The estimate of the thus manufactured image display panel was performed as is the same as the example 11. The results are shown in the following Table 2.

Example 13

The image display panel was manufactured as is the same as the example 11 except that the washing by the dry treatment was performed for 1 minute by means of an excimer lamp. The estimate of the thus manufactured image display panel was performed as is the same as the example 11. As the excimer lamp, the excimer lamp by USHIO Inc.: UEM20-172 was used. The results are shown in the following Table 2.

Example 14

The image display panel was manufactured as is the same as the example 13 except that the washing by the dry treatment was performed for 2 minutes by means of the excimer lamp (the excimer lamp by USHIO Inc.: UEM20-172). The estimate of the thus manufactured image display panel was performed as is the same as the example 13. The results are shown in the following Table 2.

Comparative Example 11

The image display panel was manufactured as is the same as the example 11 except that the washing by the dry treatment was not performed. The estimate of the thus manufactured image display panel was performed as is the same as the example 11. The results are shown in the following Table 2.

TABLE 2

|  |  | Example 11 | Example 12 | Example 13 | Example 14 | Comparative Example 11 |
|---|---|---|---|---|---|---|
| Adhesive force (MPa) | Initial stage | 12 | 17 | 11 | 16 | 7 |
|  | 80° C. × 500 hours | 15 | 18 | 12 | 18 | 9 |
|  | 60° C. × 90% RH × 1000 hours | 11 | 16 | 10 | 15 | 4 |
| Adhesive force |  | ○ | ⊚ | ○ | ⊚ | x |

From the results of Table 2, it is understood that the examples 11-14, in which the washing by the dry treatment was performed, can improve an adhesion force and obtain an excellent results even in the endurance test as compared with the comparative examples 11, in which the washing by the dry treatment was not performed.

Moreover, when the same experiments were performed with respect to the liquid powders, the results having the same tendency as those of the examples 11-14 and the comparative examples 11 could be obtained and it was confirmed that the present invention was effective to the liquid powders.

[As to the third aspect of the invention]

The colored partition walls were manufactured according to the example shown in FIGS. 4*a*-4*c*. At first, a transparent resist was applied on the ITO glass substrate 21 (constituting the transparent front substrate 2), and the exposure was performed through the mask. After that, the developing and the washing were performed, so that the partition walls 22 were manufactured on the ITO glass substrate 21. Then, the adhesive, in which the black pigment and the fillers 24 (average particle diameter: particle diameters distribution of 1-3) were previously scattered, was transferred on the partition walls 22 so as to form the adhesive layer 23. Then, predetermined image display media were sealed between the partition walls 22, and the substrate 25 (constituting the opposed substrate 1) was connected under pressure through the adhesion layer 23, so that the image display panel according to the invention was manufactured. For comparison, the image display panel was manufactured by using the adhesive in which the fillers were not included, and was referred to the comparative example.

In the example according to the invention and the comparative example, when an adhesion force between the partition walls 22 and the substrate 25 was measured, it was found that the example shows 14 kgf/cm² while the comparative example shows 7 kgf/cm². Moreover, when a color depth (OD value) of the colored partition walls was measured, it was found that the OD value of the example is 2.5 while the OD value of the comparative example is 0.7. From theses results, the example according to the invention, in which the fillers are included, can maintain a thickness of the adhesive layer 23, improve the adhesion force, maintain the color depth and show uniformity as compared with the comparative example, in which no fillers are include.

INDUSTRIAL APPLICABILITY

The image display device according to the invention is applicable to the image display unit for mobile equipment such as notebook personal computers, PDAs, cellular phones and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric POP, electric advertisement, electric price tag, electric musical score, RF-ID device and so on.

The invention claimed is:

1. A method of manufacturing an image display panel, having one or more cells formed in an isolated manner from one another by partition walls and accommodating image display media and a plurality of image display elements, in which the image display media are sealed between two opposed substrates, at least one of the two substrates being transparent, and, in which the image display media, to which an electrostatic field is applied, are made to move so as to display an image, comprising:

forming a substrate with the partition walls;
applying an adhesive mixture obtained by mixing a photo-curing resin and a heat-hardening resin on the partition walls; and then
connecting the other substrate to the partition walls through the adhesive mixture,
wherein the image display media are sealed between the partition walls by: applying the adhesive mixture on the partition walls of the substrate with the partition walls; photo-curing the adhesive mixture once; filling the image display media between the partition walls; and connecting the other substrate to the partition walls by performing a heat-hardening under a pressurized state.

2. The method of manufacturing the image display panel according to claim 1, wherein a composition of the adhesive mixture is 1-80 wt % of the photo-curing resin and 20-99 wt % of the heat-hardening resin.

3. The method of manufacturing the image display panel according to claim 1, wherein the photo-curing resin includes a photoinitiator and the heat-hardening resin includes a hardening agent.

4. The method of manufacturing the image display panel according to claim 1, wherein the image display media remaining on the partition walls are removed, after filling the image display media between the partition walls and before connecting the other substrate to the partition walls.

5. The method of manufacturing the image display panel according to claim 1, wherein the image display media are particles or liquid powders.

6. An image display panel characterized in that the improvement is manufactured according to the method of manufacturing the image display panel set forth in claim 1.

7. A method of manufacturing an image display panel, having one or more cells formed in an isolated manner from one another by partition walls and accommodating image display media and a plurality of image display elements, in which the image display media are sealed between two opposed substrates, at least one of the two substrates being transparent, and, in which the image display media, to which an electrostatic field is applied, are made to move so as to display an image, comprising:

forming a substrate with the partition walls by forming the partition walls on one substrate;
performing a washing by a dry treatment with respect to the thus manufactured substrate with the partition walls;
applying an adhesive on the partition walls; and
connecting the other substrate to the partition walls through the adhesive,
wherein, after filling the image display media between the partition walls, the washing by the dry treatment is performed with respect to the substrate with the partition walls under such a state that the image display media are filled between the partition walls.

8. The method of manufacturing the image display panel according to claim 7, wherein the washing by the dry treatment is performed with respect to the other substrate, before connecting the other substrate to the partition walls of the substrate with the partition walls.

9. The method of manufacturing the image display panel according to claim 7, wherein, after performing the washing by the dry treatment with respect to the substrate with the partition walls, the image display media are filled between the partition walls before the adhesive is applied on the partition walls or after the adhesive is applied on the partition walls.

10. The method of manufacturing the image display panel according to claim 7, wherein the washing by the dry treatment is performed by a washing method according to a treatment selected from UV ozone treatment using a low pressurized mercury lamp, UV ozone treatment using an excimer lamp, low pressurized plasma treatment, atmospheric plasma treatment, and corona treatment.

11. The method of manufacturing the image display panel according to claim 7, wherein the image display media are particles or liquid powders.

12. An image display panel characterized in that the improvement is manufactured according to the method of manufacturing the image display panel set forth in claim 7.

13. A method of manufacturing an image display panel, in which particles or liquid powders are sealed in cells formed in an isolated manner from one another by partition walls between two opposed substrates, at least one of the two substrates being transparent, and, in which the particles or the liquid powders, to which an electrostatic field is applied, are made to move so as to display an image, comprising:

forming the partition walls on one substrate by means of a pale color resist;
applying an adhesive colored by a dark color on the partition walls; and
connecting the other substrate to the partition walls through the adhesive.

14. The method of manufacturing the image display panel according to claim 13, wherein the adhesive includes a filler having an average particle diameter of 0.5-20 μm.

15. The method of manufacturing the image display panel according to claim 14, wherein the thickness of the adhesive is same as the average particle diameter of the filler.

16. The method of manufacturing the image display panel according to claim 13, wherein a thickness of the adhesive is 0.5-20 μm.

17. The method of manufacturing the image display panel according to claim 13, wherein the dark color of the adhesive is black.

18. The method of manufacturing the image display panel according to claim 13, wherein the pale color resist forming the partition walls is transparent or translucent.

19. The method of manufacturing the image display panel according to claim 13, wherein the image display media are particles or liquid powders.

20. An image display panel characterized in that the improvement is manufactured according to the method of manufacturing the image display panel set forth in claim 13.

* * * * *